US006959874B2

(12) United States Patent
Bardwell

(10) Patent No.: US 6,959,874 B2
(45) Date of Patent: Nov. 1, 2005

(54) BIOMETRIC IDENTIFICATION SYSTEM USING BIOMETRIC IMAGES AND PERSONAL IDENTIFICATION NUMBER STORED ON A MAGNETIC STRIPE AND ASSOCIATED METHODS

(76) Inventor: William E. Bardwell, 1651 Sand Key Estates Ct., #68, Clearwater, FL (US) 33767

( * ) Notice: Subject to any disclaimer, the term of this patent is extended or adjusted under 35 U.S.C. 154(b) by 301 days.

(21) Appl. No.: 10/081,886

(22) Filed: Feb. 22, 2002

(65) Prior Publication Data

US 2002/0148892 A1 Oct. 17, 2002

Related U.S. Application Data

(60) Provisional application No. 60/271,300, filed on Feb. 23, 2001, provisional application No. 60/279,466, filed on Mar. 28, 2001, provisional application No. 60/281,265, filed on Apr. 3, 2001, provisional application No. 60/293,113, filed on May 23, 2001, and provisional application No. 60/334,656, filed on Oct. 31, 2001.

(51) Int. Cl.[7] .................................................. G06K 5/00

(52) U.S. Cl. .......................... 235/493; 235/380; 902/2; 902/3; 382/115; 382/124

(58) Field of Search ................................ 235/380, 375, 235/382, 449, 493; 902/3, 5, 25, 27; 382/115, 124

(56) References Cited

U.S. PATENT DOCUMENTS

| | | | | |
|---|---|---|---|---|
| 4,745,268 A | | 5/1988 | Drexler | 235/487 |
| 4,752,676 A | | 6/1988 | Leonard et al. | 235/379 |
| 4,995,086 A | | 2/1991 | Lilley et al. | 382/4 |
| 5,267,149 A | * | 11/1993 | Anada et al. | 705/44 |
| 5,355,411 A | | 10/1994 | MacDonald | 380/23 |
| 5,432,864 A | | 7/1995 | Lu et al. | 382/118 |
| 5,509,083 A | | 4/1996 | Abathi et al. | 382/124 |
| 5,598,474 A | | 1/1997 | Johnson | 380/23 |
| 5,613,712 A | * | 3/1997 | Jeffers | 283/78 |
| 5,796,857 A | * | 8/1998 | Hara | 382/124 |
| 6,024,287 A | * | 2/2000 | Takai et al. | 235/493 |
| 6,075,876 A | | 6/2000 | Draganoff | 382/124 |
| 6,089,451 A | | 7/2000 | Krause | 235/380 |
| 6,101,477 A | | 8/2000 | Hohle et al. | 705/1 |
| 6,212,290 B1 | | 4/2001 | Gagne et al. | 382/125 |
| 6,301,376 B1 | | 10/2001 | Draganoff | 382/124 |
| 6,325,285 B1 | * | 12/2001 | Baratelli | 235/380 |
| 6,328,209 B1 | * | 12/2001 | O'Boyle | 235/380 |
| 6,527,173 B1 | * | 3/2003 | Narusawa et al. | 235/380 |
| 6,581,839 B1 | * | 6/2003 | Lasch et al. | 235/487 |

* cited by examiner

*Primary Examiner*—Michael G. Lee
*Assistant Examiner*—Seung H Lee
(74) *Attorney, Agent, or Firm*—Allen, Dyer, Doppelt, Milbrath & Gilchrist, P.A.

(57) ABSTRACT

The system and method store biometric information and a personal identification number (PIN) on a token having a magnetic storage medium. A biometric image is captured, biometric data is produced and a PIN is provided by an authorized user. The biometric data and PIN are stored on the magnetic storage medium of the token for subsequent use in verifying an authorized user of the token.

20 Claims, 9 Drawing Sheets

DEVICE CONFIGURATION TABLE

| DESCRIPTION | MODULE NAME | VALUE (ESTABLISHED "AT COMPILE TIME") | COMMENTS |
|---|---|---|---|
| DEVICE CONTROL CODE | | NINE NUMERIC CHARACTERS | USED FOR PREVENTING THEFT OF DEVICE ESTABLISHED AT COMPILE TIME |
| ENCODING APPROACH NUMBER | | "00" TO "15" | SELECTED FROM THE ENCODING APPROACH TABLE. ESTABLISHED AT COMPILE TIME |
| SENSOR PROCESSING MODULE | SENRXX | WHERE "XX" EQUALS "00" TO "99" | ESTABLISHED AT COMPILE TIME |
| ENROLLMENT/VERIFICATION ALGORITHM MODULE# | ENRLXX AND VERFXX | WHERE "XX" EQUALS "00" | DEFAULT ALGORITHM SELECTED BASED UPON THE "ENCODING APPROACH NUMBER" (SEE ABOVE) |
| ENROLLMENT/VERIFICATION ALGORITHM MODULE# | ENRLXX AND VERFXX | WHERE "XX" EQUALS "01" (IF "BLANK" NO ALTERNATIVE ALGORITHM EXISTS) | SECOND ALGORITHM |
| ENROLLMENT/VERIFICATION ALGORITHM MODULE# | ENRLXX AND VERFXX | WHERE "XX" EQUALS "02" TO "14" (IF "BLANK" NO ALTERNATIVE ALGORITHM EXISTS) | |
| ENROLLMENT/VERIFICATION ALGORITHM MODULE# | ENRLXX AND VERFXX | WHERE "XX" EQUALS "15" (IF "BLANK" NO ALTERNATIVE ALGORITHM EXISTS) | LAST ALGORITHM |
| CARD ENCODING/DECODING MODULE# (DEFAULT = "0") | ENCDXX AND DECDXX | WHERE "XX" EQUALS "00" THAT IS THE ENCODING APPROACH NUMBER | DEFAULT MODULE SELECTED BASED UPON THE "ENCODING APPROACH NUMBER" (SEE ABOVE) |
| CARD ENCODING/DECODING MODULE# | ENCDXX AND DECDXX | WHERE "XX" EQUALS "01" TO "14" (IF "BLANK" NO ALTERNATIVE MODULE EXISTS) | |
| CARD ENCODING/DECODING MODULE# | ENCDXX AND DECDXX | WHERE "XX" EQUALS "15" (IF "BLANK" NO ALTERNATIVE MODULE EXISTS) | LAST MODULE |
| CARD READER/WRITER MODULE# (DEFAULT="0") | CDRDXX AND CDWRXX | WHERE "XX" EQUALS "00" TO "99" | ESTABLISHED AT COMPILE TIME |
| COERCIVITY | | FOUR NUMERIC CHARACTERS (DEFAULT= HIGH COERCIVITY) | COERCIVITY LEVEL OF MAGNETIC STRIPE WRITER |
| SENSOR BAUD RATE | | SIX NUMERIC CHARACTERS WHERE "9600" bps IS THE DEFAULT | ESTABLISHED AT COMPILE TIME |

FIG. 9.

ENCODING APPROACH TABLE

| ENCODING APPROACH NUMBER (COL 1) | ENCODING MAGNETIC STRIPE TRACK NUMBER (S) *** (COL 2) | MAXIUM SIZE OF "BIOMETRIC TEMPLATE" (BITS) (COL 3) | MAXIUM NUMBER OF CHARACTERS /TRACK (COL 4) | NO. OF BITS TRANSLATED AT A TIME (COL 5) | ENCODING TRANS-LATION TABLE (COL 6) | DATA FORMAT (COL 7) | TRACK FORMAT (COL 8) |
|---|---|---|---|---|---|---|---|
| 0 | 1 | 474 | 79 | 6 | 0 | ANSI/ISO ALPHANUMERIC | ISO |
| 1 | 1 | 395 | 79 | 5 | 1 | ANSI/ISO ALPHANUMERIC | ISO |
| 2 | 3 | 428 | 107 | 4 | 2 | ANSI/ISO NUMERIC | ISO |
| 3 | 1 | 492 | 82 | 6 | 0 | ANSI/ISO ALPHANUMERIC | AAMVA |
| 4 | 3 | 492 | 82 | 6 | 0 | ANSI/ISO ALPHANUMERIC | AAMVA |
| 5 | 1 | 410 | 82 | 5 | 1 | ANSI/ISO ALPHANUMERIC | AAMVA |
| 6 | 3 | 410 | 82 | 5 | 1 | ANSI/ISO ALPHANUMERIC | AAMVA |
| 7 | 1 | 510 | 86 | 6 | 0 | ANSI/ISO ALPHANUMERIC | AAMVA* |
| 8 | 3 | 510 | 86 | 6 | 0 | ANSI/ISO ALPHANUMERIC | AAMVA* |
| 9 | 1 | 425 | 86 | 5 | 1 | ANSI/ISO ALPHANUMERIC | AAMVA* |
| 10 | 3 | 425 | 86 | 5 | 1 | ANSI/ISO ALPHANUMERIC | AAMVA* |
| 11 | 1 | 595 | 86 | N/A | N/A | CUSTOM ** | CUSTOM ** |
| 12 | 2 | 595 | 86 | N/A | N/A | CUSTOM ** | CUSTOM ** 210 bpi |
| 13 | 3 | 595 | 86 | N/A | N/A | CUSTOM ** | CUSTOM ** |
| 14 | 2 | 510 | 86 | 6 | 0 | ANSI/ISO ALPHANUMERIC | NON-STANDARD 210 bpi |
| 15 | 2 | 428 | 107 | 4 | 2 | ANSI/ISO NUMERIC | NON-STANDARD 210 bpi |

FIG. 10.

STANDARD BIOMETRIC TEMPLATE

230

| FIELD | VALUE/SIZE | COMMENTS |
|---|---|---|
| HEADER: SOFTWARE VERSION NUMBER | "0" TO "256" - 8 BITS (8BITS/BYTE) | THE SOFTWARE VERSION NUMBER MAY RELATE TO THE ENROLLMENT/VERIFICATION ALGORITHM MODULE#, CARD ENCODING MODULE AND/OR ENCODING APPROACH NUMBER THAT ARE USED TO CREATE THE "BIOMETRIC" TEMPLATE. |
| COPY PROTECT CODE | 6 BITS (8BITS/BYTE) | SEVEN BIT LRC CHARACTER MINUS THE PARITY BIT. THE COPY PROTECT CODE IS ENBEDDED IN THE "YARDSTICK" DATA. |
| "MINI-PIN" | "0" TO "999" - 10 BITS (8BITS/BYTE) | THE "MINI-PIN" IS EMBEDDED IN THE "YARDSTICK" DATA. |
| ENROLL FINGER CODE | 3 BITS (8BITS/BYTE) | WHERE:<br>0 - MIDDLE, RIGHT, 1 - INDEX, RIGHT<br>2 - RING, RIGHT, 3 - MIDDLE, LEFT<br>4 - INDEX, LEFT, 5 - RING, LEFT<br>6 - OTHER FINGER |
| RESERVE | 1 BITS (8BITS/BYTE) | |
| ALGORITHM BIOMETRIC TEMPLATE W/O HEADER | | |
| DATA - "YARDSTICKS" | 72 BYTES (7BITS/BYTE) | THE LAST BYTE IN EACH OF THE YARDSTICKS IS NOT USED |
| TRAILER | 7 BITS (8BITS/BYTE) | - 4 BITS - EXTENDED PIN (0-9)<br>- 3 BITS - ERROR BIT INCREMENT COUNTER ((0-7) SEE TABLE BELOW) |
| | 7 BITS (8BITS/BYTE) | - 6 BITS USED FOR YARDSTICK LOCATIONS<br>- 1 BIT HARD TO ENROLL FLAG |
| TOTAL | 79 BYTES (7BITS/BYTE) | DOES NOT INCLUDE CONTROL CHARACTERS |

FIG. 11.

ALGORITHM BIOMETRIC TEMPLATE

216

| FIELD | VALUE/SIZE | COMMENTS |
|---|---|---|
| HEADER: | 2 BYTE | HEX "01" |
| DATA - "YARDSTICKS" | 60 BYTES | THE LAST BYTE IN EACH OF THE YARDSTICKS IS NOT USED |
| TRAILER | 1 BYTE | - 4 BITS - EXTENDED PIN (0-9)<br>- 3 BITS - ERROR BIT INCREMENT COUNTER ((0-7) SEE TABLE BELOW) |
| | 1 BYTE | - 6 BITS USED FOR YARDSTICK LOCATIONS<br>- 1 BIT HARD TO ENROLL FLAG |
| TOTAL | 64 BYTES (8 BITS/BYTE) | |

FIG. 12.

ERROR BIT RATE INCREMENT COUNTER TABLE

| NUMBER OF BITS THAT FAILED DURING VERIFY FOR THE YARDSTICKS PROCESSED (BASE ERROR BIT RATE + ERROR BIT INCREMENT COUNTER) | ERROR BIT INCREMENT COUNTER | COMMENTS |
|---|---|---|
| 20 | 0 | TYPICAL ERROR BITS INCREMENT COUNTER IF NO PIN IS USED |
| 21 | 1 | |
| 22 | 2 | TYPICAL ERROR BITS INCREMENT COUNTER IF PIN IS USED |
| 23 | 3 | TYPICAL ERROR BITS INCREMENT COUNTER IF EXT PIN IS USED |
| 24 | 4 | |
| 25 | 5 | |
| 26 | 6 | |
| 27 | 7 | |

FIG. 13.

210 STANDARD DIGITIZED ARRAY OF IMAGE PIXELS

| | | | | |
|---|---|---|---|---|
| FFFFFFFF | | | DDDDDDDD | BBBBBBBB |
| | | | | |
| | | GGGGGGGG | | |
| | | | | |
| EEEEEEEE | | | CCCCCCCC | AAAAAAAA |

WHERE:

- "AAAAAAAA" ARE THE GRAY SCALE FOR COLUMN 0, ROW 0, THE BOTTOM RIGHT CORNER OF THE IMAGE
- "BBBBBBBB" ARE THE GRAY SCALE FOR COLUMN 0, ROW 255, THE TOP RIGHT CORNER OF THE IMAGE
- "CCCCCCCC" ARE THE GRAY SCALE FOR COLUMN 1, ROW 0
- "DDDDDDDD" ARE THE GRAY SCALE FOR COLUMN 1, ROW 255
- "EEEEEEEE" ARE THE GRAY SCALE FOR COLUMN 255, ROW 0, THE BOTTOM LEFT CORNER OF THE IMAGE
- "FFFFFFFF" ARE THE GRAY SCALE FOR COLUMN 255, ROW 255, THE TOP LEFT CORNER OF THE IMAGE
- "GGGGGGGG" ARE THE GRAY SCALE FOR COLUMN 128, ROW 128 WHICH SHOULD APPROXIMATE THE CENTER OF THE SENSOR FINGERPRINT IMAGE
- 8 BITS/ "CELL" WHERE "00000000" IS " NO RIDGE" ON A GRAY SCALE
- 8 BITS/ "CELL" WHERE "00000001" TO "11111111" IS "RIDGE" ON A GRAY SCALE DEPENDING UPON THE SENSOR NUMBER

FIG. 14.

BIOMETRIC IDENTIFICATION SYSTEM USING BIOMETRIC IMAGES AND PERSONAL IDENTIFICATION NUMBER STORED ON A MAGNETIC STRIPE AND ASSOCIATED METHODS

RELATED APPLICATIONS

This application is based upon prior filed copending provisional applications No. 60/271,300 filed Feb. 23, 2001, No. 60/279,466 filed Mar. 28, 2001, No. 60/281,265 filed Apr. 3, 2001, No. 60/293,113 filed May 23, 2001, and No. 60/334,656 filed Oct. 31, 2001 the entire disclosures of which are incorporated herein by reference.

FIELD OF THE INVENTION

The present invention relates to the field of biometric identification and verification, and, more particularly to biometric verification using a card with biometric image data and a personal identification number stored thereon.

BACKGROUND OF THE INVENTION

Biometric verification and identification may be desirable for a number of business applications. For example, biometric verification at a point-of-sale terminal offers the possibility to reduce credit card fraud. A biometric characteristic of the purchaser can be compared with a biometric characteristic stored on the credit card. If there is a match, the transaction is authorized.

U.S. Pat. No. 5,432,864 to Lu et al. discloses a biometric verification approach wherein track 3 of a magnetic stripe on a credit card can be used to store so-called "Eigenface parameters". The Eigenface parameters may be reduced to less than 100 bytes according to the patent. Unfortunately, the Eigenface parameters may not be sufficiently accurate in confirming the card bearer's identify.

Along those lines, U.S. Pat. No. 5,355,411 to MacDonald discloses storing on magnetic tracks, an electronic signature and user's portrait. U.S. Pat. No. 4,752,676 to Leonard et al. discloses comparing voice print information with stored data on a magnetic stripe. Again, such characteristics may not provide a sufficiently high accuracy rate to be practically used.

U.S. Pat. No. 4,995,086 to Lilley et al. discloses magnetic tracks on a plastic card that store fingerprint related data. The stored data is for a degree of correlation between a fingerprint of the authorized individual and a stored and selected reference signal image and the code number of this reference signal image. A fingerprint detection terminal with a sensor contains a memory win which the selected reference signal image is stored. The sensor compares the actual fingerprint of an individual to be checked with the corresponding reference signal image identified on the plastic card and stored in the fingerprint detection terminal. The determined degree of correlation is compared to the degree of correlation stored on the plastic card to determine if the person bearing the card is the authorized user. Unfortunately, the approach disclosed is fairly complicated and may lead to inaccuracy in terms of false acceptance and/or false rejection rates.

SUMMARY OF THE INVENTION

In view of the foregoing background, it is therefore an object of the invention to provide a reliable and accurate biometric identification and verification system and methods.

This and other objects, features and advantages in accordance with the present invention are provided by a method for storing biometric information on a token having a magnetic storage medium. The method includes capturing a biometric image and generating biometric data therefrom, obtaining a personal identification number (PIN), and storing the biometric data and the PIN on the magnetic storage medium of the token. The biometric information is preferably based upon a fingerprint while capturing the biometric image comprises capturing the biometric image using a fingerprint sensor. Obtaining the PIN may include requesting an authorized token user to provide the PIN.

The token may comprise a card corresponding to the ANSI/ISO/IEC 7810 standard and the magnetic storage medium comprises a magnetic stripe having three tracks in accordance with the ANSI/ISO/IEC 7810 standard, while storing the biometric data and PIN comprises storing the biometric data and PIN on the third track of the magnetic stripe. The token may comprises a generally rectangular substrate, and be an access card, credit card, debit card, identification card and/or smart card.

Another method aspect of the invention is directed to a method of regulating the use of a token, the token comprising at least one of an access card, credit card, debit card, identification card and smart card, and including at least a magnetic storage medium thereon. The method includes enrolling an authorized token user by capturing a first biometric image and generating therefrom first digital pixel data for a first array of image pixels, processing the first digital pixel data to produce enrollment biometric data, obtaining a personal identification number (PIN) from the authorized user, and storing the enrollment biometric data and PIN on the magnetic storage medium of the token. Furthermore, the method includes verifying an identity of a token holder presenting the token by capturing a second biometric image and generating therefrom second digital pixel data for a second array of image pixels, processing the second digital pixel data to produce verification biometric data, verifying the PIN stored on the magnetic medium, and comparing the verification biometric data with the enrollment biometric data stored on the magnetic storage medium of the token to determine if the token holder is the authorized token user.

Obtaining the PIN may comprise requesting an authorized token user to provide the PIN, and verifying the PIN may include reading the PIN from the magnetic storage medium, requesting a verification PIN from the token holder, and comparing the PIN read from the magnetic storage medium with the verification PIN.

A system for regulating the use of a token is also provided. The token comprising at least one of an access card, credit card, debit card, identification card and smart card, and including at least a magnetic storage medium thereon. The system including an authorized token user enrollment unit including a first biometric sensor device for capturing a first biometric image and generating therefrom first digital pixel data for a first array of image pixels, a first image processor for processing the first digital pixel data to produce enrollment biometric data, a personal identification number (PIN) unit for obtaining a PIN from the authorized user, and a first magnetic storage medium reader/writer for writing the enrollment biometric data and the PIN on the magnetic storage medium of the token. Furthermore, the system includes at least one token holder verification unit for verifying the identity of a token holder presenting the token. The token holder verification unit including a second biometric sensor device for capturing a second biometric image and generating therefrom second digital pixel data for a second array of image pixels, a second image processor for processing the second digital pixel data to produce verification biometric data, a second magnetic storage medium reader for reading the enrollment biometric data and the PIN from the magnetic storage medium of the token, a PIN verification unit for verifying the PIN, and a comparator for comparing the verification biometric data produced by the second image processor with the enrollment biometric data stored on the magnetic storage medium of the token to determine if the token holder is the authorized token user.

Each of the biometric sensor devices preferably comprises a fingerprint sensor, which may include a finger slide, finger guides and a finger stop. Also, the PIN unit may comprise an input device for entry of the PIN by the authorized user, and the PIN verification unit may comprise a second input device for entry of the verification PIN by the token holder. The token may comprise a card corresponding to the ANSI/ISO/IEC 7810 standard and the magnetic storage medium comprises a magnetic stripe having three tracks in accordance with the ANSI/ISO/IEC 7810 standard. Here, the first magnetic storage medium reader/writer writes the enrollment biometric data and PIN on the third track of the magnetic stripe.

BRIEF DESCRIPTION OF THE DRAWINGS

FIG. 9 is an embodiment of a Device Configuration Table.

FIG. 10 is an embodiment of an Encoding Approach Table.

FIG. 11 is a table illustrating an embodiment of the Standard Biometric Template of the software architecture of FIGS. 7 and 8.

FIG. 12 is a table illustrating an embodiment of the Algorithm Biometric Template of the software architecture of FIGS. 7 and 8.

FIG. 13 is a table illustrating and Error Bit Rate Increment Counter.

FIG. 14 is a table illustrating an embodiment of the Standard Digitized Array of Image Pixels of the software architecture of FIGS. 7 and 8.

DETAILED DESCRIPTION OF THE PREFERRED EMBODIMENTS

Figure 1:
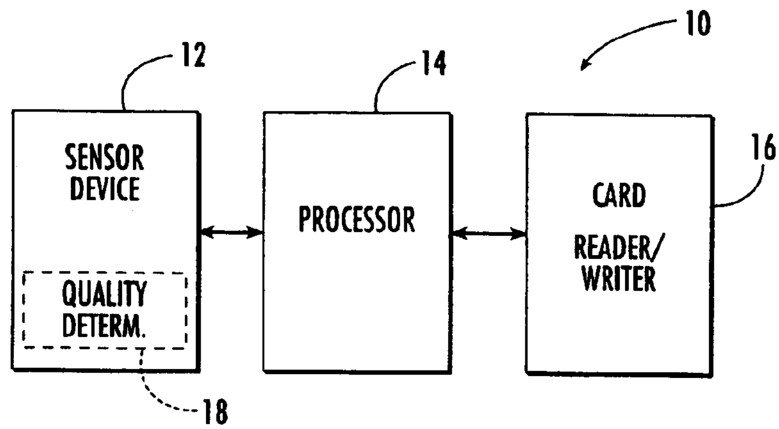
FIG. 1 is a schematic diagram of an enrollment unit of the biometric identification and verification system in accordance with the present invention.
Figure 2:
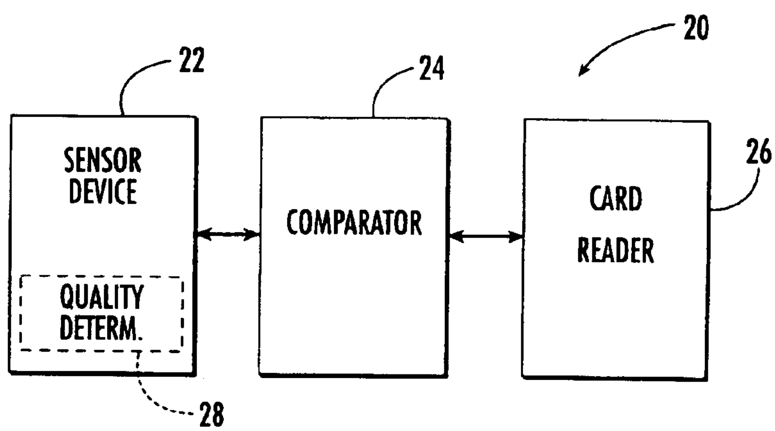
FIG. 2 is a schematic diagram of a verification unit of the biometric identification and verification system in accordance with the present invention.
Figure 3:
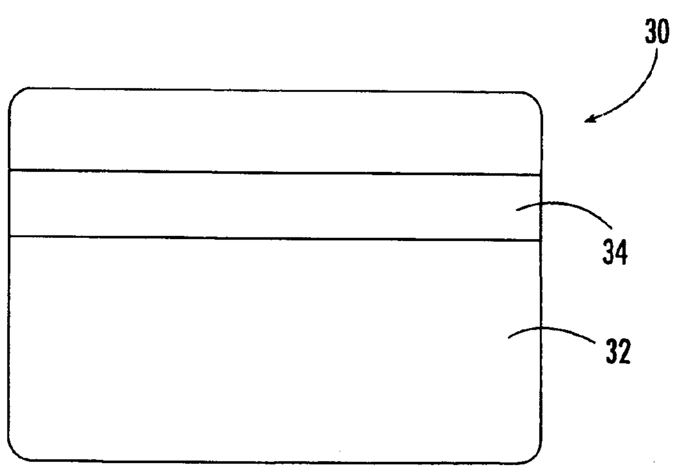
FIG. 3 is a schematic diagram of a card including a magnetic stripe in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring to FIGS. 1–4, a system for regulating the use of a token 30 will now be described. The token 30 (FIG. 3) includes a substrate 32 and a magnetic storage medium 34, such as a magnetic stripe, thereon. The system includes an authorized token user enrollment unit 10 (FIG. 1) including a first biometric sensor device 12 for capturing a first biometric image and generating therefrom first digital pixel data for a first array of image pixels. An image processor 14 selects a first plurality of spaced apart sets of image pixels from the first array of image pixels, and processes respective sets of digital pixel data for the first plurality of selected spaced apart sets of image pixels to produce enrollment biometric data. A magnetic storage medium reader/writer 16 writes the enrollment biometric data on the magnetic storage medium 34 of the token 30.

Furthermore, the system includes at least one token holder verification unit 20 (FIG. 2) for verifying the identity of a token holder presenting the token 30. For example, the token holder is typically the owner of the card. The unit 20 also has a biometric sensor device 22 for capturing a second biometric image and generating therefrom second digital pixel data for a second array of image pixels. A second magnetic storage medium reader 26 reads the enrollment biometric data from the magnetic storage medium 34 of the token 30, and a comparator 24 compares the second digital pixel data with the enrollment biometric data stored on the magnetic storage medium 34 of the token 30 to determine if the token holder is the authorized token user.

Figure 5:
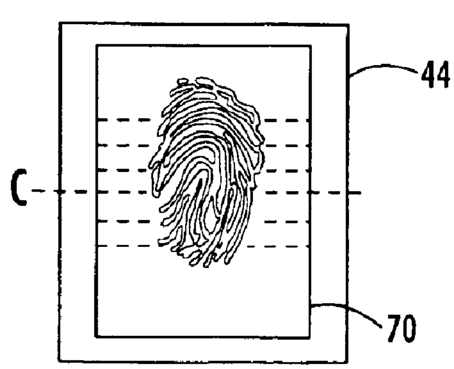
FIG. 5 is a schematic diagram of the sensor of sensing device of FIG. 4.

The biometric sensor device 22 is preferably a biometric sensor 44 having a sensing area 70 while the plurality of spaced apart sets of image pixels comprises a reference set of image pixels based upon a predetermined location, such as a centerline C (FIG. 5), on the sensing area, and at least one other set of image pixels a predetermined distance from the reference set or centerline. The biometric sensor devices 12, 22 may each comprise an image quality determination unit 18, 28 for determining the quality of captured biometric images. Each set of image pixels may comprise a series of consecutive and colinear image pixels.

The biometric information is preferably based upon a fingerprint while the biometric sensor devices each comprise a fingerprint sensor 44. The biometric sensor device may further comprise a finger slide 42 adjacent the fingerprint sensor 44. Also, the finger slide 42 may have finger guides 46 and a finger stop 48. Again, the magnetic storage medium preferably includes a magnetic stripe 34 having three tracks in accordance with the ISO/IEC 7810 and 7811 standards, while the magnetic storage medium reader/writer preferably writes the enrollment biometric data on the third track.

It will be appreciated that the embodiment described above enrolls a fingerprint image and subsequently compares another fingerprint image for verification. Much as described in U.S. Pat. No. 6,075,876 to Dragonoff, which is herein incorporated by reference in it's entirety, the enrollment extracts yardsticks, or a set of image pixels, which may comprise half-lines, whole lines, or columns. The yardsticks are preferably of uniform size, and each yardstick preferably contains black-white data for the image to be enrolled. Preferably the enrollment stores data in a suitable format. When comparing an image to be verified, in a simple case (for line art), the first yardstick is compared with the acquired image (which preferably is larger than the enrollment window). It will be understood that electronic signals or data for "images" are compared, rather than optical images themselves, in the preferred embodiment. In the preferred algorithm, the first (stored) yardstick is sought to be matched with a given line of the acquired image, and is compared on a bit-by-bit basis. Absent finding a match, the yardstick is shifted along the line, or, if necessary, will shift to another line, and seek a match along that row. Assuming a match results for the first yardstick, other spaced apart yardsticks are next compared to the image to be verified, and can be shifted left or right a limited amount, or not at all, depending on skew. If the best match is below a tolerance, verification is positive. This technique may also be applied also to grey scale data.

It should also be appreciated that while the preferred embodiments herein refer to a magnetic medium such as a magnetic stripe on a card, nothing precludes the method and system from storing the information on any other type of storage medium, such as, but not limited to, dynamic memories, e.g. optical and magneto-optical, and/or static memories, e.g. semiconductor or integrated circuit memories.

Figure 6:
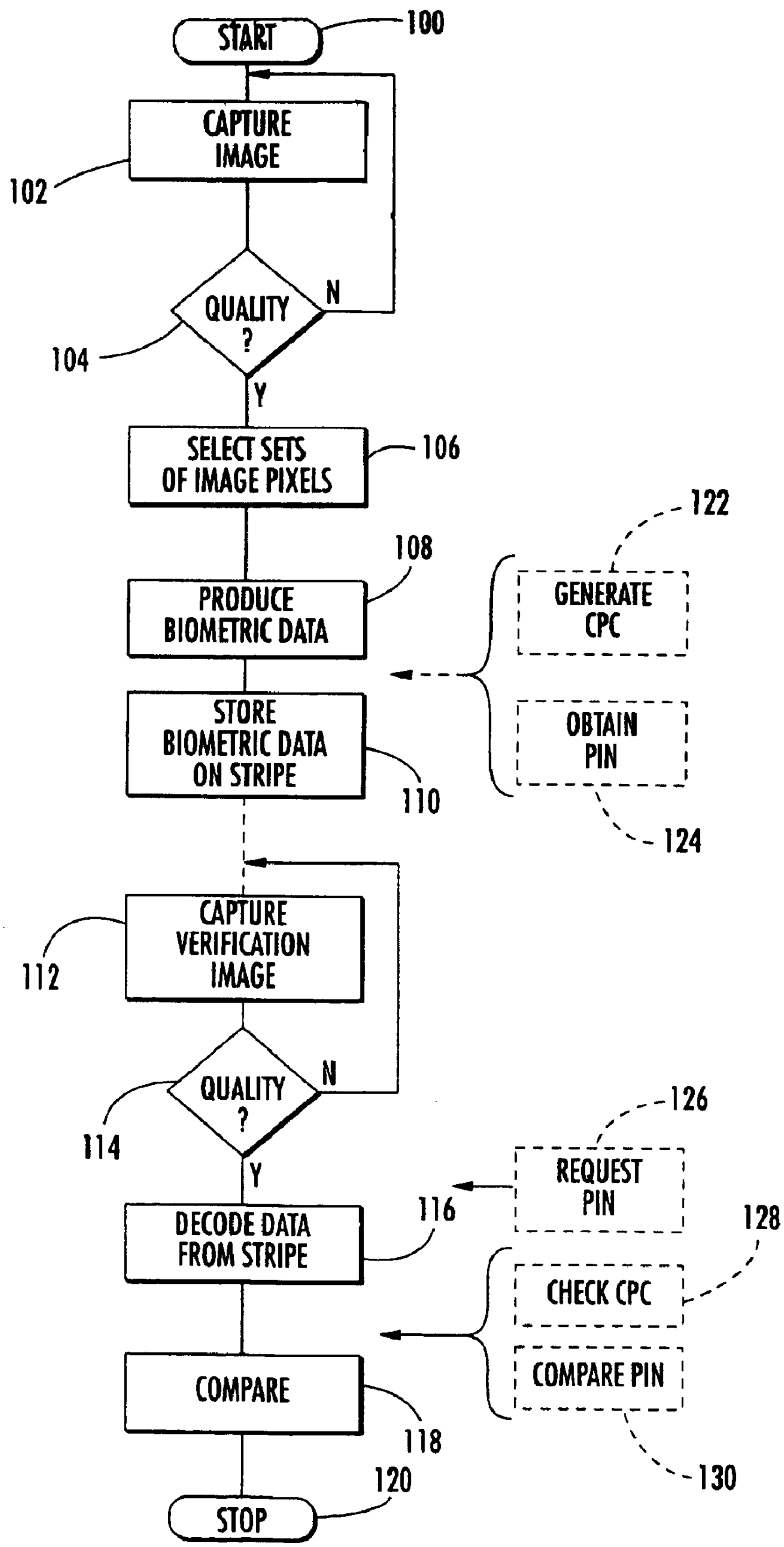
FIG. 6 is a flowchart illustrating the steps of the biometric identification and verification method in accordance with the present invention.

A method for storing biometric information on a token having a magnetic storage medium will be described with reference to FIG. 6. The method includes capturing a biometric image 102 and generating therefrom digital pixel data for an array of image pixels, and, at 106, selecting a plurality of spaced apart sets of image pixels from the array of image pixels. Also, the method includes processing respective sets of digital pixel data for the selected spaced apart sets of image pixels to produce biometric data 108, and storing the biometric data on the magnetic storage medium of the token 110.

As discussed above, capturing the biometric image may include using a biometric sensor 44 having a sensing area 70, and selecting the plurality of spaced apart sets of image pixels may include selecting a reference set of image pixels based upon a predetermined location on the sensing area, such as the centerline C, and selecting at least one other set of image pixels a predetermined distance from the reference set. The location of the reference set of image pixels and the other set(s) of image pixels may also be stored on the magnetic storage medium. Capturing the biometric image may include capturing multiple biometric images until a preferred biometric image is captured based upon a resolution threshold as indicated by the quality check block 104.

Again, each set of image pixels may be a series of consecutive and colinear image pixels. Also, the biometric information is preferably based upon a fingerprint while capturing the biometric image may include capturing the biometric image using a fingerprint sensor. The token 30 (FIG. 3) preferably comprises a card 32 corresponding to the ISO/IEC 7810 standard and the magnetic storage medium comprises a magnetic stripe 34 having three tracks in accordance with the ISO/IEC 7811 standard. Here, storing the biometric data preferably includes storing the biometric data on the third track. The token 30 may be a generally rectangular substrate such as an access card, credit card, debit card, frequent flyer card, driver's license card, identification card and/or smart card.

The method may further include verifying an identity of a token holder presenting the token by capturing a second biometric image 112 and generating therefrom second digital pixel data for a second array of image pixels, decoding the biometric data stored on the magnetic storage medium 116 and comparing the second digital pixel data with the first plurality of selected spaced apart sets of image pixels of enrollment biometric data stored on the magnetic storage medium of the token to determine if the token holder is the authorized token user 118. Again, the quality of the image may be checked 114.

Further, the method may include generating a copy protect code, and storing the copy protect code on the magnetic storage medium of the token 122, and/or obtaining a personal identification number (PIN), and storing the PIN on the magnetic storage medium of the token 124. Verifying the PIN stored on the magnetic medium may include reading the PIN from the magnetic storage medium, requesting a verification PIN from the token holder (block 126), and comparing the PIN read from the magnetic storage medium with the verification PIN (block 130). Also, the copy protect code may be encrypted, and generating the copy protect code may include combining bits of data stored on the magnetic stripe. Generating the copy protect code, may, for example, include calculating a longitudinal redundancy check (LRC) character based upon a combination of data stored on first and second tracks of the magnetic stripe. Of course, the verification process would include verifying the copy protect code stored on the magnetic medium 128.

Figure 7:
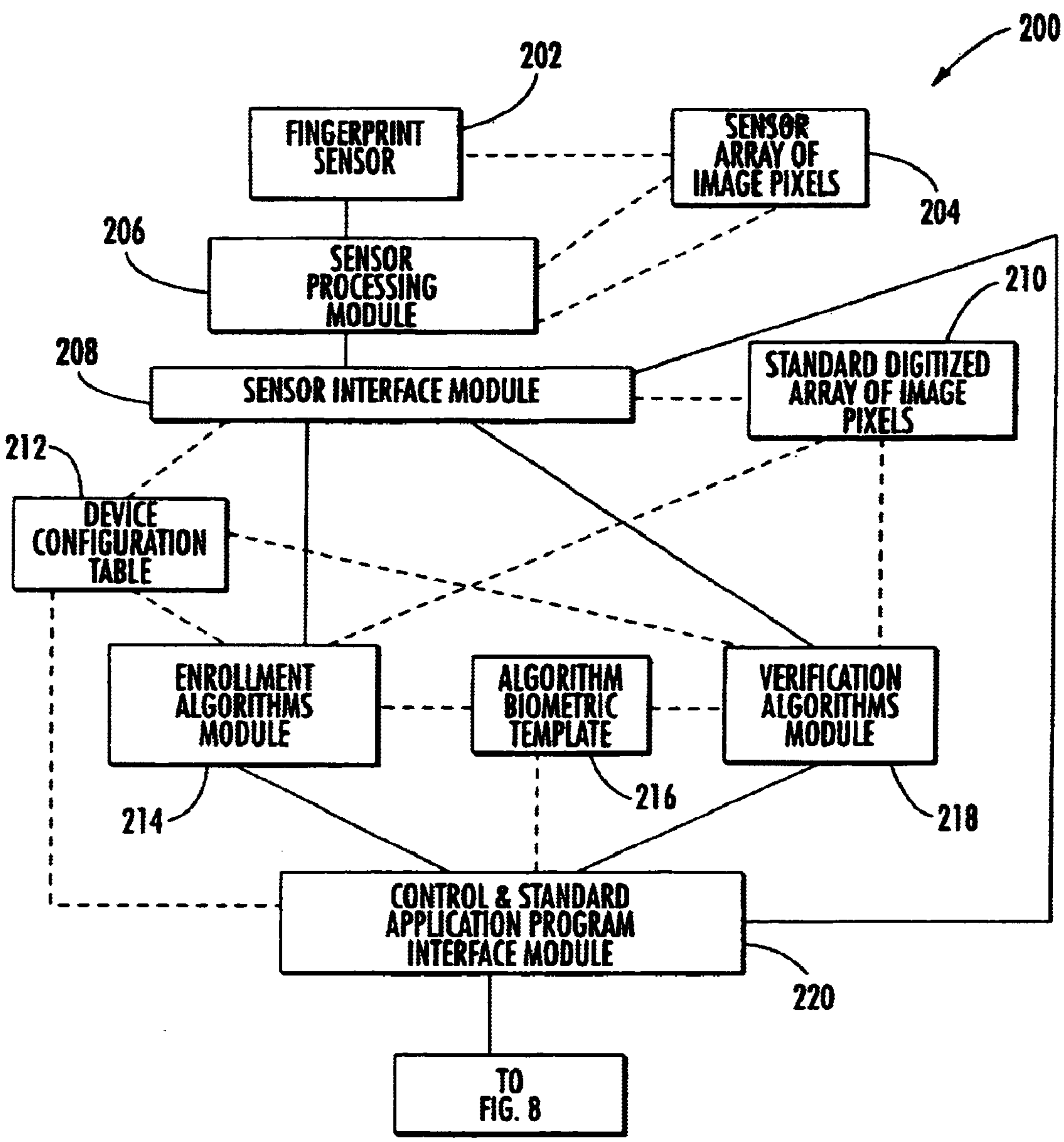
FIGS. 7 and 8 are schematic diagrams of the software architecture for implementing the method and system of the present invention.
Figure 8:
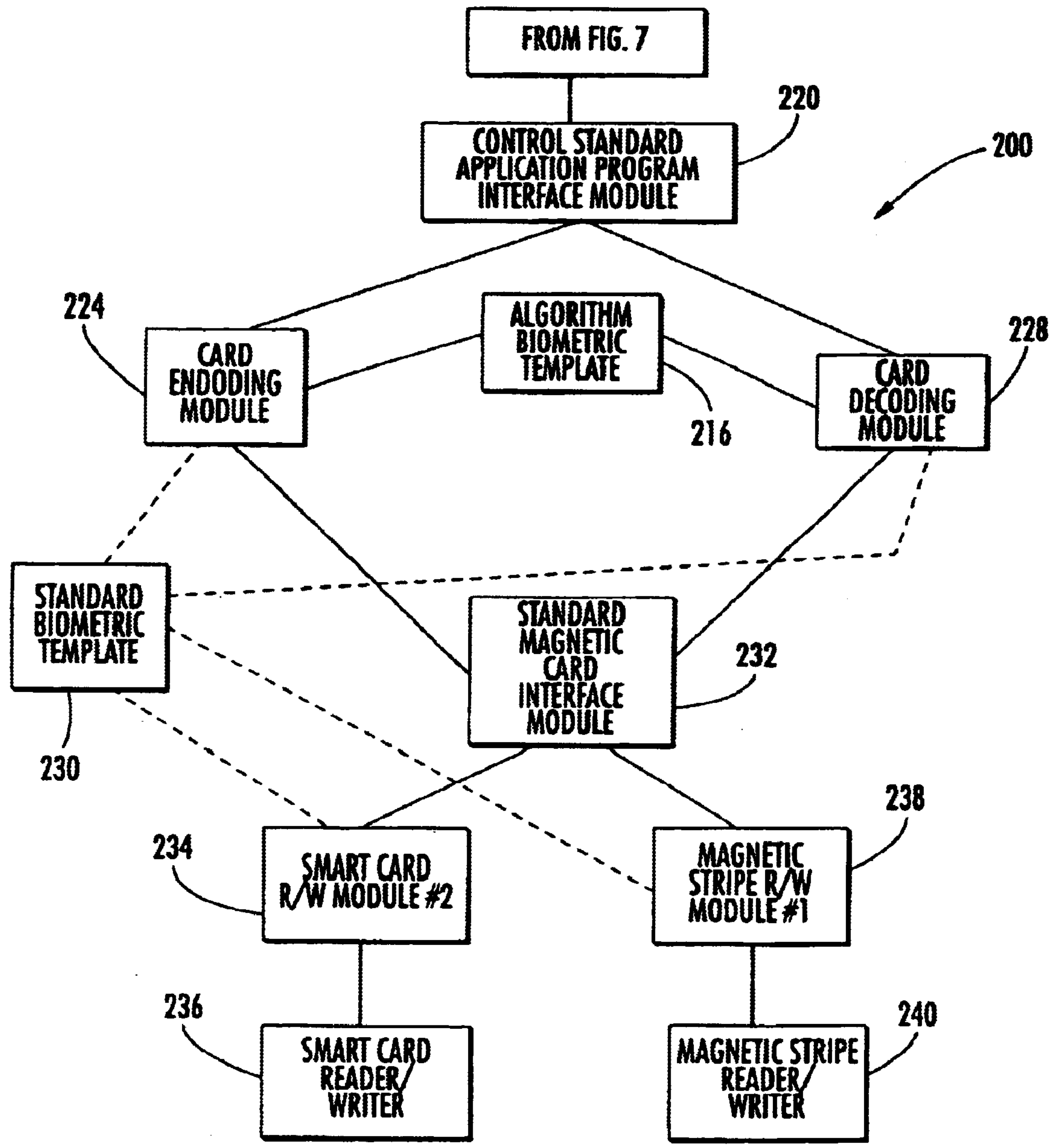

A more specific embodiment of the method and system for reliable and accurate biometric identification and verification will be described with reference to FIGS. 7 and 8. The following describes the encoding system and process that is used for biometric enrollment. Biometric enrollment is the process that is followed to capture and encode a biometric or an individual's unique physical characteristic (fingerprint, eye, hand, face, etc.) on a magnetic stripe of an identification or smart card. By encoding a biometric on a credit, debit, ATM, Frequent Flyer, Driver's License or other identification or smart cards, the secured identification card can be used to authorize credit, debit, check cashing, cash withdrawals, wire transfer and other financial transactions; to identify card holders at security checkpoints and to provide positive identification. This embodiment describes the encoding of fingerprint image pixels on a magnetic stripe of an Identification or Smart Card but the system could be successfully used for encoding other biometric characteristics.

The Card Encoding Module 224 prompts the user to "Swipe the card" and initiates the Standard Interface Module 232 to read the magnetic stripe. For enrollment, the user is prompted to place their fingers on a finger slide 42 and moves their fingers forward. The finger slide 42 (FIG. 4) controls the positioning of the finger over the sensor 44 and is used to minimize the finger placement rotation and skew on the sensor. As the finger is slid into position, the finger slide has a stop 48 that restricts any further forward movement into the finger slide over the sensor. The finger guides/wedges 46 separate the fingers in such a way as to minimize the rotation or "roll" of the finger on the sensor.

This embodiment of the encoding/decoding system hardware includes a fingerprint sensor module 12, microcontroller 14, 24, serial ports 58 and 60, LCD display 50, user switches 52, power supply, power switch 54, power connector 56, case 62, magnetic card reader/writer 16, and magnetic card reader 26. The microcontroller oversees all internal system functions including the fingerprint sensor, LCD display, and user switches. Control of the external RS-232 serial ports is also managed by the microcontroller. The external serial ports facilitate communication with the magnetic card reader/writer and optional connection to a host or PC. The on-board power supply includes voltage regulators and power management circuitry to ensure reliable operation over a wide range of supply voltages and temperatures.

A biometric device such as a fingerprint sensor 202 provides signals representing image pixels. There are many types of fingerprint sensors. Each type of sensor may utilize different technologies to capture the fingerprint image. Optical based sensors use cameras and lens to capture the image. Capacitive sensors utilize a silicon integrated circuit containing an array of capacitive sensor plates. Each sensor plate produces a capacitance measurement whose value becomes a gray-scale value that becomes part of the image. Recently, new technology-based sensors have been introduced in the marketplace. For example, some new sensors are able to generate a small AC electric field between the integrated circuit and the fingers "live" layer. Elements in the sensor receive the signals and create digital patterns that mimic very accurately the fingerprint structure. The operational characteristics of each fingerprint sensor vary widely by manufacturer and the use of technology in terms of clarity, resolution and accuracy of the image. Sensors that use the AC electric field technology appears to provide a more accurate and clearer image than those captured by other technologies since the new sensors are capable of detecting the ridges and valleys in the "live" layer of cells that are located below the surface of the skin.

The Sensor Processing Module 206 is responsible for selecting and creating a good array of image pixels. The fingerprint sensor 202 captures the image and uses an Analog to Digital Converter to digitize the array of image pixels. The following process is followed to insure a good array of fingerprint image pixels is available in the Algorithm Biometric Template 216 for processing. If a good image cannot be provided, another array of image pixels is requested from the fingerprint sensor.

The fingerprint sensor histogram is used to determine if the fingerprint image is of good clarity by analyzing the pixel distribution across the histogram. The image is enhanced by power and phase adjustments. The fingerprint sensor 202 using an A/D converter generates a digitized grayscale array of image pixels. The Module 206 checks for correct centering of the finger within the grayscale array of image pixels. The black/white balance within the grayscale array of image pixels is checked to insure that the image is not too dark or light. The Module 206 counts ridges in the center of the grayscale array of image pixels to determine if the image is of good clarity. The ridge count is verified to be between the minimum and maximum ridge tolerances. The number of consecutive gap widths of one pixel in length is measured to insure that there is not an excessive level of noise in the image.

The encoding system 200 utilizes the Enrollment Algorithm Module 214 to analyze the digitized array of image pixels to select several "yardsticks" or a plurality of spaced apart sets of image pixels that are the most effective for biometric identification to be encoded onto a Magnetic Stripe of an Identification or Smart Card. After the centerlines of the array of image pixels are selected, the first "yardstick" is identified based upon selecting one of two sets of image pixels that are located at a predetermined plus or minus equivalent distance from either the horizontal or vertical centerline. At least one other "yardstick" is identified based upon selecting one of two sets of image pixels that are located at another predetermined plus or minus equivalent distance from either the horizontal, vertical or diagonal centerline.

The sets of image pixels are selected and stored in the algorithm biometric template 216 by analyzing each "yardstick" according to the following process: The number of ridges are counted; The maximum gap between the ridges are measured to determine if any fingerprint scars or scrapes exist; The variance between the ridge count and minimum and maximum ridge thresholds are determined; The set of image pixels with the smallest maximum gap is identified; and The yardsticks with sets of image pixels with the smallest ridge variance and smallest maximum gap between the ridges are selected based upon the "best fit" method.

After a good enrollment is achieved and if the "Hard to Enroll" was not depressed, the enrollment must be verified as will be discussed in further detail below. If more than one verification fails, the "Enrollment is Unsuccessful" and a new enrollment may be attempted using another finger.

The Card Encoding Module 224 supports various encoding approaches which would be defined in an Encoding Approach Table, as would be readily appreciated by the skilled artisan. The encoding approach is established at "compile time" in the Device Configuration Table (FIG. 9) after analyzing the requirements of the magnetic stripe of the identification or smart card including the track number to be encoded, maximum size of the "algorithm biometric template", maximum characters per track, data format and track format.

Figure 4:
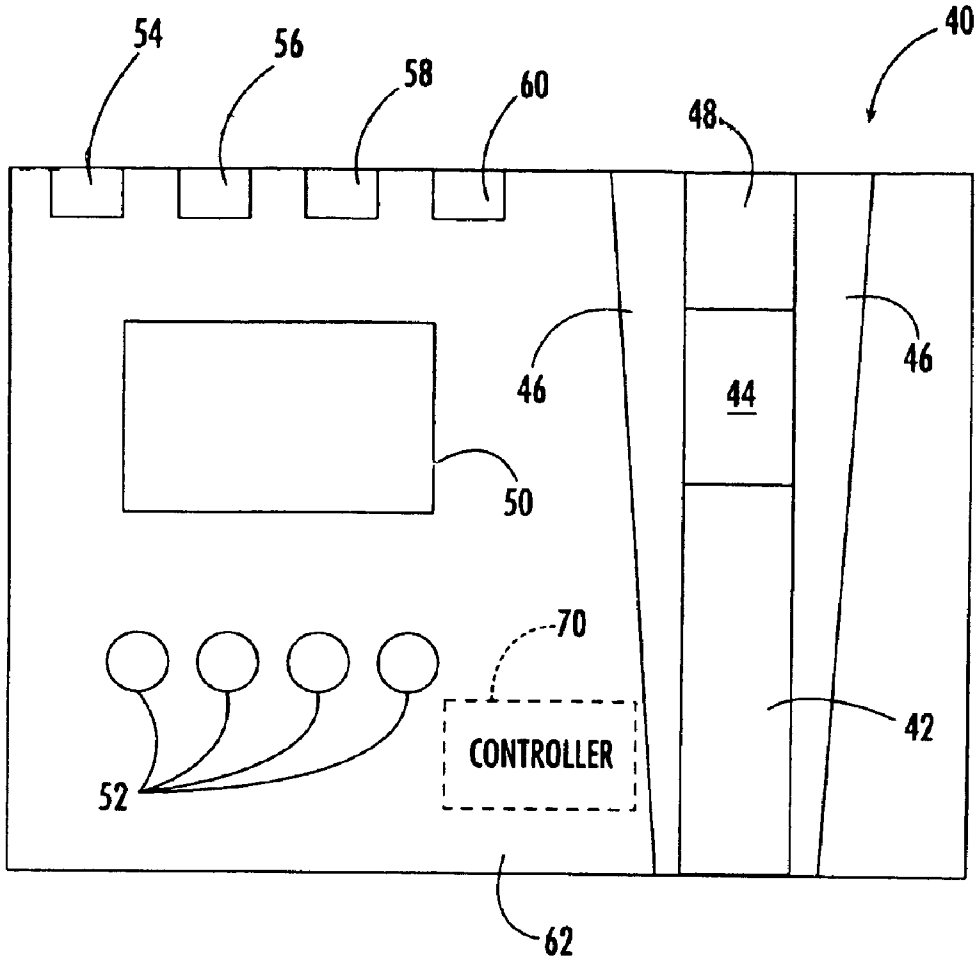
FIG. 4 is a schematic diagram of a sensing device in accordance with the enrollment and verification units of FIGS. 1 and 2.

The Card Encoding Module 224 creates a header that is included in standard biometric template 230 to identify the Software Version Number (FIG. 11). The Software Version Number may relate to the Enrollment/Verification Algorithm Modules 214, 218, Card Encoding/Decoding Module 224, 228 and/or an Encoding Approach Number. The Card Encoding Module 224 prompts the user to enter their Personal Identification Number (PIN) from "000" to "999" using the switches for entering the 100's, 10's and 1's digits of the number (FIG. 4; 52). As the PIN is entered, the number will be displayed on the LCD screen 50. After the user completes entering the PIN, the "Enter" switch is depressed. The encoding system encrypts the PIN and includes it the standard biometric template 230.

If the "Hard to Enroll" Flag switch is depressed, the Card Encoding Module 224 prompts the user to enter their Extended Personal Identification Number (PIN) from "0" to "9" using the switch for entering the 1's digits of the number. Again, as the PIN is entered, the number will be displayed on the LCD screen. After the user completes entering the Extended PIN, the "Enter" switch is depressed. The encoding system encrypts the Extended PIN and includes it in the standard biometric template 230.

The Card Encoding Module 224 creates a Copy Protect Code from the data on the magnetic stripe. The code is encrypted and included in the standard biometric template 230. The copy protect code is preferably determined by combining bits of data on the two tracks that are not being written on. The Copy Protect Code is six bits, the seven bit code, less the parity bit, for example. The Copy Protect Code is used to prevent track data from being altered or biometric image pixels from being copied from one Magnetic Stripe on an Identification or Smart Card to a Magnetic Stripe on another Identification or Smart Card.

Beginning with the bit in the upper, left-most corner of the algorithm biometric template 216, 226 (FIG. 12), the Card Encoding Module 224 translates the bits left to right, top to bottom four, five or six bits at a time into the standard biometric template 230 (FIG. 11). Using the encoding approach number identified in the Device Configuration Table (FIG. 9), an Encoding Translation Table is selected from Column 6 of the Encoding Approach Table (FIG. 10).

Note: All of the Encoding Approach Numbers (0–10) in FIG. 10 can be encoded on Track 2 but would not comply with the ISO or AAMVA track format standards. Some Magnetic Stripe Card Readers/Writers will read and write 86 characters on a track in the AAMVA format. Some Magnetic Stripe Card Readers/Writers support a "Custom" mode in which ANSI/ISO control characters are not recognized. The track density is 210 bits per inch (bpi) unless otherwise specified.

Using the Encoding Translation Table, four, five or six bits as identified in Column 1 are translated to either a ANSI/ISO alphanumeric or numeric character data format. The ANSI/ISO hex data format may also be indicated. No translation is required for "Custom" track formats.

The Card Encoding Module 224 analyzes the four, five or six bits translated at a time in the standard biometric template 230 to determine if they are control, reserved or other characters that require a special translation. Depending upon the magnetic stripe or smart card reader/writer, the control, reserved or other characters that require special translation may be translated to one or two ANSI/ISO alphanumeric or numeric characters. The Card Encoding Module 224 analyzes the four, five or six bits translated at a time in the standard biometric template 230 to determine if the bits can be compressed with succeeding sequences bits. The bits may be compressed using several standard compression algorithms to reduce the size of the biometric template. The bits may be encrypted using a standard encryption algorithm.

The Card Encoding Module 224 prompts the Enroll Finger Code to be entered from "0" to "7" using the switches for entering the 1's digits of the number. As the Enroll Finger Code is entered, the number will be displayed on the LCD screen 50. After the user completes entering the Enroll Finger Code, the "Enter" switch is depressed. The encoding system encrypts the Enroll Finger Code and includes it in the standard biometric template 230. The Enrollment Finger Code will be used to prompt the user to place the proper finger on the sensor during Verification. If the size of the standard biometric template 230 exceeds the maximum number of characters per track as defined in the Encoding Approach Table (FIG. 10: column 4) for the selected encoding approach, a new image is selected and the enrollment process is performed again.

The Card Encoding Module 224 sets the Error Bit Rate Increment Counter in the standard biometric template 230 to reflect that a PIN was entered. The Error Bit Rate Increment Counter will be added to the base Error Bit Rate to improve the likelihood of a successful verification. If the "Hard to Enroll" switch was depressed, the Card Encoding Module 224 sets the Error Bit Rate Increment Counter (FIG. 13) in the standard biometric template 230 to reflect that an Extended PIN was entered.

The Magnetic Stripe or Smart Card Reader/Writer Module 234, 238 encodes the standard biometric template 230 on the magnetic stripe of identification or smart cards using a magnetic stripe or Smart card reader/writer 236, 240 according to the coercivity code in the Device Configuration Table. After a successful write to the magnetic stripe, the "Enrollment is Successful" message is displayed.

The following describes the decoding system and process that is used for biometric verification. Biometric verification is the process that is followed to decode a biometric or an individual's unique physical characteristic (fingerprint, eye, hand, face, etc.) from a magnetic stripe of an identification or smart card. By verifying a biometric on a credit, debit, ATM, Frequent Flyer, Driver's License or other identification or smart cards, the "secured identification card can be used to authorize credit, debit, check cashing, cash withdrawals, wire transfer and other financial transactions; to identify card holders at security checkpoints and to provide positive identification. This embodiment describes the decoding of fingerprint image pixels on a magnetic stripe of an Identification or Smart Card but the system could be successfully used for decoding other biometric characteristics.

The Magnetic Stripe or Smart Card Reader/Writer Module 234, 238 decodes the standard biometric template 230 from the magnetic stripe of a identification or smart cards using a Magnetic Stripe or Smart card Reader/Writer Module 236, 240. The Software Version Number information in the Header of the standard biometric template is used to determine which Verification Algorithm Module 218, Card Decoding Module 228 and Encoding Approach Number will be used in the decoding process. The Card Decoding Module 228 analyzes the bits in the standard biometric template 230 to determine if they are compressed. If required, the bits are decompressed using a decompression algorithm. The Card Decoding Module 228 analyzes the bits in the standard biometric template 230 to determine if they are encrypted. If required, the bits are decrypted using a decryption algorithm.

Using the Encoding Translation Table that was used during Enrollment, the Card Decoding Module 228 software searches the standard biometric template 230 to determine if one or two ANSI/ISO alphanumeric or numeric characters as defined in the Encoding Translation Table can be found. If a match occurs, the one or two control, reserved or other characters are translated to the ANSI/ISO alphanumeric or numeric character. Using the Encoding Translation Table that was used during Enrollment, the Card Decoding Module 228 translates either the ANSI/ISO alphanumeric or numeric character in the standard biometric template 230 to four, five or six bits at a time.

The Card Decoding Module 228 decrypts the "Code" in the standard biometric template 230 and compares it to the Copy Protect Code that is determined by combining at least some of the data on the two tracks that do not contain "biometric template" data on the swiped identification card. If the Copy Protect Codes do not match, a "Copy Protect Code Violation" message is displayed on the LCD screen 50 and the Verification process is discontinued.

The Card Decoding Module 228 decodes the Personal Identification Number (PIN) in the standard biometric template 230. The user is asked to enter their PIN "000" to "999" using the switches 52 for entering the 100's, 10's and 1's digits of the number. As the PIN is entered, the number will be displayed on the LCD screen. After the user completes entering the PIN, the "Enter" switch is depressed.

If the "Hard to Enroll" flag is set, the Card Encoding Module software decodes the Extended PIN in the standard biometric template 230. The user is prompted enter their Extended Personal Identification Number (PIN) from "0" to "9" using the switch for entering the 1's digits of the number. As the PIN is entered, the number will be displayed on the LCD screen. After the user completes entering the PIN, the "Enter" switch is depressed.

For verification, the user is prompted on the LCD screen to place the correct finger (using the Enrolled Finger Code) on a finger slide 42 and to move their fingers forward. Again, the finger slide controls the positioning of the finger over the fingerprint sensor and is used to minimize the inconsistency of placement of the finger on the sensor for each placement attempt.

The Sensor Processing Module 206 is responsible for selecting and creating a good image. If a good image cannot be provided, another image is requested from the fingerprint sensor 202. The following process is followed to insure a good image or array of image pixels are available in the Algorithm Biometric Template 216 for processing. The fingerprint sensor histogram is used to determine if the fingerprint image is of good clarity by analyzing the pixel distribution across the histogram. The image is enhanced by power and phase adjustments. The fingerprint sensor using an A/D converter generates a digitized grayscale array of image pixels. The Module 206 checks for correct centering of the finger within the grayscale array of image pixels. The black/white balance within the grayscale array of image pixels is checked to insure that the image is not too dark or light. The Module 206 counts ridges in the center of the grayscale array of image pixels to determine if the image is of good clarity. The ridge count is verified to be between the minimum and maximum ridge tolerances. The number of consecutive gap widths of one pixel in length is measured to insure that there is not an excessive level of noise in the image. To minimize false rejections, an Error Bit Increment Counter (FIG. 13) in the Standard Biometric Template 230 will be added to the base Error Bit Rate.

The Verification Algorithm Module 218 takes the First "yardstick" in the standard biometric template 230 retrieved from the Magnetic Stripe of an Identification or Smart Card and makes a comparison to those yardsticks in the Algorithm Biometric Template 216. In the Algorithm Biometric Template 216, the bit by bit comparison begins at the lowest horizontal or vertical scanline and incrementally continues to the highest horizontal or vertical scanline. The bits in the scanline are shifted until the bits begin to match. A match is found if after the comparison of a scanline is completed, the number of bits that don't match are less than the First Yardstick Error Bit Rate. If no match is found, the array of image pixels are rotated 1 pixel to adjust for image rotation and skew and the match is repeated. If no match is found after the array of image pixels are rotated a maximum number of times as defined by a Rotation Threshold, another biometric image is captured by the fingerprint sensor 202 and another search is performed if a system "timeout" did not occur. If a system timeout occurs, "Verification is Unsuccessful" is displayed on the screen 50.

If a match to the First "yardstick" is successful, the Verification Algorithm Module 218 takes the remaining "yardsticks" in the "standard biometric template" 230 and makes a comparison to those in the Algorithm Biometric Template 216. Using the First Other Yardstick offset location in the trailer record, the offset is added to the First Yardstick location and a bit by bit match is performed in the scanline. If the number of bits that don't match which are added to the First Other Yardstick Error Counter are less than the First Other Error Bit Rate, a match for the second Other Yardstick is performed. Using the Second Other Yardstick offset location in the trailer record, the offset is added to the First Yardstick location and a bit by bit match is performed in the scanline. If the number of bits that don't match in the Second Other Yardstick Error Counter are greater than Second Other Error Bit Rate, the First Other Yardstick search process begins again from the First Yardstick location plus or minus one scanline to accommodate the stretching of the skin. If no match exists for First Other Yardstick, another biometric image is captured by the fingerprint sensor 202 and another First Yardstick search is performed if a system "timeout" did not occur. If a system timeout occurs, "Verification is Unsuccessful" is displayed on the screen 50.

After the First and Second Other Yardsticks are found, the (Third thru "N") Other Yardstick searches process begins by adding the (Third thru "N") Other Yardstick offset locations in the trailer record to the First Yardstick location. If the accumulated count of errors in the (Third thru "N") Other Yardstick Error Counter is greater than the (Third thru "N") Error Bit Rate after all the "yardsticks" in the standard biometric template 230 are compared, the verification is unsuccessful. For unsuccessful verifications, another biometric image is captured by the fingerprint sensor 202 and another search is performed if a system "timeout" did not occur. If a system timeout occurs, "Verification is Unsuccessful" is displayed on the screen 50.

If the accumulated count of errors in the (Third thru "N") Other Yardstick Error Counter is less than the (Third thru "N") Error Bit Rate after all the "yardsticks" in the "standard biometric template" are compared and no PIN or Extended PIN match errors occurred, "Verification is Successful" on the LCD screen. An authorization code and other data may be also transmitted to a host computer. If the count of errors in the verification counter is greater than the Error Bit Rate after all the "yardsticks" in the standard biometric template are compared or a PIN or Extended PIN error occurred, "Verification is Unsuccessful" is displayed on the LCD screen.

To insure that all tracks are not copied from the magnetic stripe of one card to another, information such as the cardholder's name and credit card number are displayed on the LCD 50. The displayed information can be used to validate the information on the transaction source documents to insure that they are the same following a "Successful Verification".

The architecture of the encoding/decoding image pixel software is designed and structured to allow new biometric sensors, enrollment algorithms, verification algorithms, magnetic stripe readers/writers and smart card readers/writers to be easily substituted for the components that are described in this embodiment. For example, a new fingerprint sensor 202 can be substituted for the existing sensor by connecting the new sensor to the device and installing a new Sensor Processing Module 206. No other changes would be required to the encoding/decoding computing system hardware or software to support the new sensor.

Sensor Processing Module 206 Functions: Acquires a good array of image pixels—Assures the image meets the minimum clarity threshold requirements; Converts the Sensor Array of Image Pixels 204 to Standard Digitized Array of Image Pixels 210 (FIG. 14); Processes the following Standard Application Program Interface Module 220 sensor commands: Calibrate—to calibrate the biometric sensor 202, Reset—to reset the biometric sensor, Image—to acquire the image of the finger that was last enrolled or verified, Status—to display the current status of the sensor or sensor commands.

Sensor Interface Module 208 Functions: Using the Device Configuration Table (FIG. 9), initiates the Sensor Processing Module 206 -Sensor Processing Module is determined at "compile time", -Sensor Baud Rate is determined at "compile time"; and Initiates all the sensor 202 commands.

Enrollment Algorithm Module 214 Functions: Processes Enroll command -Initiates the Sensor Interface Module; Basic functions: establishes the centerline of the image, Determines best first "yardstick" and location, Determines best other "yardsticks" and locations; If Successful Enrollment -Creates Algorithm Biometric Template, and -Returns to Card Encoding Module via Standard API Module; If Unsuccessful Enrollment -If possible, selects another Enrollment Algorithm Module 214 using Device Configuration Table, and -If not possible, prompts user "Enrollment is Unsuccessful."

Verification Algorithm Module 218 Functions: Processes Verify command -Initiate the Sensor Interface Module; Basic functions -Starts search for First "Yardstick" in the Standard Biometric Template 230, -After the First "Yardstick" is found, search for the Other "Yardsticks" at the location stored in Standard Biometric Template 230, -If "Verification is Successful", Prompt user "Verification is Successful" and display the cardholders name and number, -If Unsuccessful Enrollment, Prompt user "Verification is Unsuccessful."

Control and Standard Application Program Interface Module 220 Functions (API): During program initialization, -Prompts the user to enter the nine numeric character Device Control Code using the LCD, compare the entered Device Control Code to the code in the Device Configuration Table, if the Device Control Code is not, discontinue the operation, -Sets the coercivity in the magnetic card reader/writer to the default according to the Device Configuration Table, -Configure reader/writer for "ISO plus AAMVA"; If the "Enroll" switch is depressed, initiates the Card Encoding Module using the Device Configuration Table; If the "Verify" switch is depressed, initiates the Card Decoding Module using the Device Configuration Table; If the "Calibrate" switch is depressed, processes the command using the Sensor Processing Module; If the "Reset" switches are depressed, processes the command to reset the Fingerprint Sensor Module 202, Microcontroller, LCD display and Magnetic Stripe Reader/Writer 236, 240; If the "Coercivity" switch is depressed, processes the command and updates the coercivity field in the Device Configuration Table; If the "Hard to Enroll" switch is depressed, processes the command, sets the Hard to Enroll Code in Standard Biometric Template 230 and initiates the Card Encoding Module 224 using the Device Configuration Table; Processes the "Status" and "Image" commands by initiating the Sensor Processing Module 206; Process Upload/download commands, Upload and download of Algorithm Biometric Template 216; Switch use: Switch 1 & 4—"Reset", Switch (left)—"Coercivity" and 100's number entry, Switch 2—"Hard to Enroll" and 10's number entry, Switch 3—"Enroll" and (0 to 9) number entry and "Yes" entry, Switch 4 (right)—"Verify" and "Enter" and "No" entry, and Switch 2 & 3—"Calibrate."

Card Encoding Module 224: Prompts user communication via LCD Display to "Swipe Card"; Initiates read of card using Standard Magnetic Card Interface Module 232; Prompts user to "Place finger on Sensor"; Initiates the Enrollment Algorithm Module 214 using Device Configuration Table; If enrollment is good, initiates the Verification Algorithm Module 218 four times to verify enroll is good, -If all four verifies are not good, prompt user "Enrollment is Unsuccessful", -Each Verify does not require a card swipe; Selects encoding approach from Device Configuration Table; Adds Header to Standard Biometric Template 230; Requests enter of PIN, encodes and adds to Standard Biometric Template 230, -To minimize false rejections, sets the Error Bit Rate Increment Counter in Standard Biometric Template 230 to standard value if PIN is entered; If Hard to Enroll Flag is set, requests enter of Extended PIN, encodes and adds to Standard Biometric Template 230, -To minimize false rejections, sets the Error Bit Rate Increment Counter in Standard Biometric Template 230 to standard value if Extended PIN is entered; Creates Copy Protect Code, encodes and adds to Standard Biometric Template 230; Using Encoding Approach Number in Device Configuration Table, selects Encoding Translation Table and translates Algorithm Biometric Template 216 data into Standard Biometric Template 230; Using Encoding Approach Number in Device Configuration Table, use Encoding Translation Table and translates control, reserve and other characters in Standard Biometric Template 230; Compresses data, if necessary, in Standard Biometric Template 230; Encrypts data in Standard Biometric Template 230; Check for maximum length of Standard Biometric Template 230; Initiates the write of the Standard Biometric Template 230 to the magnetic stripe using the Standard Magnetic Card Interface Module 232; and Prompts user that "Enrollment is Successful."

Card Decoding Module: Prompts user communication via LED Display to "Swipe Card"; Initiates Read of card into Standard Biometric Template using the Standard Magnetic Card Interface Module; Using the header, determine the Enrollment/Verification Algorithm module 214, 218 and Card Encoding/Decoding module 224, 228 to be used; Verify modules are available in software by using device control table; Tests for fingerprint data on card; If no fingerprint data, prompt user that "No Enrollment Information on Card"; If biometric template data is encrypted, decrypt the data, if required; If biometric template data is compressed, de-compress data, if required; Using Encoding Approach Number in Header and Device Configuration Table, translates control, reserve and other characters in Standard Biometric Template 230; Using Encoding Approach Number in Header and Device Configuration Table, translates all chacters in the Standard Biometric Template 230; De-codes and verify Copy Protect Code in Standard Biometric Template 230, -If Copy Protect Code is not valid, Prompts user: "Invalid Copy Protect Code"; Requests enter of PIN; If the Hard to Enroll flag is set, requests enter of Extended PIN; Stores Header, yardstick and trailer in the Algorithm Biometric Template 216; Using the Enroll Finger Code, prompts user to "Place finger on Sensor" and initiates Verification Algorithm Module 218 using the Standard API Module 220.

Standard Magnetic Card Interface Module 232: Initiates the Read into the Standard Biometric Template 230, -Use the Device Configuration Table to determine Card Reader/Writer Module 234, 238 to initiate; Initiates the Write from the Standard Biometric Template 230, -Use the Device Configuration Table to determine Card Reader/Writer Module 234, 238 to initiate.

Card Reader/Writer Module 234, 238: Card Reader Module, -Using the Encoding Approach Table and Device Configuration Table, reads the card data into the Standard Biometric Template 230 from the Magnetic Stripe or Smart Card Reader/Writer 236, 240; Card Writer Module, -Using the Encoding Approach Table and Device Configuration Table, writes the card data from the Standard Biometric Template 230 to the Magnetic Stripe or Smart Card Reader/Writer 236, 240.

Encoding/decoding computing system hardware: A preferred embodiment of the Fingerprint Sensor Module includes a Motorola 56309 Digital Signal Processor (DSP), AuthenTec AF-S2 "FingerLoc" fingerprint sensor with analog to digital converter, Serial port for connection to microcontroller, and a Parallel port; LCD display having a 2 lines by 20 characters/line display; a Jackrabbit RCM2020 microcontroller with Serial port connection to Fingerprint Sensor Module (9600 bps), Serial port connection to a Magnetic Stripe Card Reader/Writer (9600 bps), Serial port for future connection to a host or PC (9600 bps), Parallel port or another connection to LCD display, Four switches, and One Reset switch; Magnetic Stripe Card Reader/Writer, e.g. a AMC C722; Circuit Board with Power supply, Power connections and Serial connections.

The disclosures of related applications entitled "BIOMETRIC IDENTIFICATION SYSTEM USING A MAGNETIC STRIPE AND ASSOCIATED METHODS" (atty. Docket No. 59718); "BIOMETRIC IDENTIFICATION SYSTEM USING BIOMETRIC IMAGES AND COPY PROTECT CODE STORED ON A MAGNETIC STRIPE AND ASSOCIATED METHODS" (atty. Docket No. 59730) to the same inventor and concurrently filed herewith are incorporated by reference herein in their entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for storing biometric information on a token comprising at least a magnetic storage medium, the method comprising:

capturing a biometric image and generating biometric data therefrom including generating pixel data for an array of image pixels comprising a series of consecutive and colinear image pixels;

obtaining a personal identification number (PIN); and storing the biometric data and the PIN on the magnetic storage medium of the token.

2. The method according to claim 1, wherein the biometric information is based upon a fingerprint; and wherein capturing the biometric image comprises capturing the biometric image using a fingerprint sensor.

3. The method according to claim 1, wherein obtaining the PIN comprises requesting an authorized token user to provide the PIN.

4. The method according to claim 1, wherein the token comprises a card corresponding to the ANSI/ISO/IEC 7810 standard and the magnetic storage medium comprises a magnetic stripe having three tracks in accordance with the ANSI/ISO/IEC 7810 standard; and wherein storing the biometric data and PIN comprises storing the biometric data and PIN on the third track of the magnetic stripe.

5. The method according to claim 1, wherein the token comprises a generally rectangular substrate.

6. The method according to claim 1, wherein the token comprises at least one of an access card, credit card, debit card, identification card and smart card.

7. A method of regulating the use of a token, the token comprising at least one of an access card, credit card, debit card, identification card and smart card, and including at least a magnetic storage medium thereon, the method comprising:

enrolling an authorized token user by capturing a first biometric image and generating therefrom first digital pixel data for a first array of image pixels, processing the first digital pixel data to produce enrollment biometric data, obtaining a first personal identification number (PIN) from the authorized user, and storing the enrollment biometric data and first PIN on the magnetic storage medium of the token, and verifying an identity of a token holder presenting the token by capturing a second biometric image and generating therefrom second digital pixel data for a second array of image pixels, capturing a second personal identification number from the token holder, processing the second digital pixel data and the second PIN to produce verification biometric data, and comparing the verification biometric data and second PIN with the enrollment biometric data and first PIN stored on the magnetic storage medium of the token to determine if the token holder is the authorized token user.

8. The method according to claim 7, wherein the biometric information is based upon a fingerprint, and wherein capturing the biometric images comprises capturing the biometric images using a fingerprint sensor.

9. The method according to claim 7, wherein obtaining the PIN comprises requesting an authorized token user to provide the PIN.

10. The method according to claim 9, wherein verifying the PIN comprises:

reading the PIN from the magnetic storage medium;

requesting a verification PIN from the token holder; and comparing the PIN read from the magnetic storage medium with the verification PIN.

11. The method according to claim 7, wherein the token comprises a card corresponding to the ANSI/ISO/IEC 7810 standard and the magnetic storage medium comprises a magnetic stripe having three tracks in accordance with the ANSI/ISO/IEC 7810 standard; and wherein storing the enrollment biometric data and PIN comprises storing the enrollment biometric data and PIN on the third track of the magnetic stripe.

12. The method according to claim 7, wherein the array of image pixels comprises a series of consecutive and colinear image pixels.

13. A system for regulating the use of a token, the token comprising at least one of an access card, credit card, debit card, identification card and smart card, and including at least a magnetic storage medium thereon, the system comprising:

an authorized token user enrollment unit including a first biometric sensor device for capturing a first biometric image and generating therefrom first digital pixel data for a first array of image pixels, a first image processor for processing the first digital pixel data to produce enrollment biometric data, a personal identification number (PIN) unit for obtaining a PIN from the authorized user, and a first magnetic storage medium reader/writer for writing the enrollment biometric data and the PIN on the magnetic storage medium of the token;

at least one token holder verification unit for verifying the identity of a token holder presenting the token, and comprising a second biometric sensor device for capturing a second biometric image and generating therefrom second digital pixel data for a second array of image pixels, a second image processor for processing the second digital pixel data to produce verification biometric data, a second magnetic storage medium reader for reading the enrollment biometric data and the PIN from the magnetic storage medium of the token, a PIN verification unit for verifying the PIN, and a comparator for comparing the verification biometric data produced by the second image processor with the enrollment biometric data stored on the magnetic storage medium of the token to determine if the token holder is the authorized token user.

14. The system according to claim 13, wherein the biometric information is based upon a fingerprint; and wherein each of the biometric sensor devices comprises a fingerprint sensor.

15. The system according to claim 14, wherein the biometric sensor device further comprises a finger slide adjacent the fingerprint sensor.

16. The system according to claim 15, wherein the finger slide further comprises finger guides and a finger stop.

17. The system according to claim 15, wherein the PIN unit comprises an input device for entry of the PIN by the authorized user.

18. The system according to claim 13, wherein the token comprises a card corresponding to the ANSI/ISO/IEC 7810 standard and the magnetic storage medium comprises a magnetic stripe having three tracks in accordance with the ANSI/ISO/IEC 7810 standard; and wherein the first magnetic storage medium reader/writer writes the enrollment biometric data and PIN on the third track of the magnetic stripe.

19. The system according to claim 18, wherein the PIN verification unit comprises a second input device for entry of the verification PIN by the token holder.

20. The system according to claim 13, wherein the array of image pixels comprises a series of consecutive and colinear image pixels.

* * * * *